A. K. ROSENBECK.
TOOL HOLDER AND TOOL.
APPLICATION FILED JULY 21, 1909.
969,983.
Patented Sept. 13, 1910.
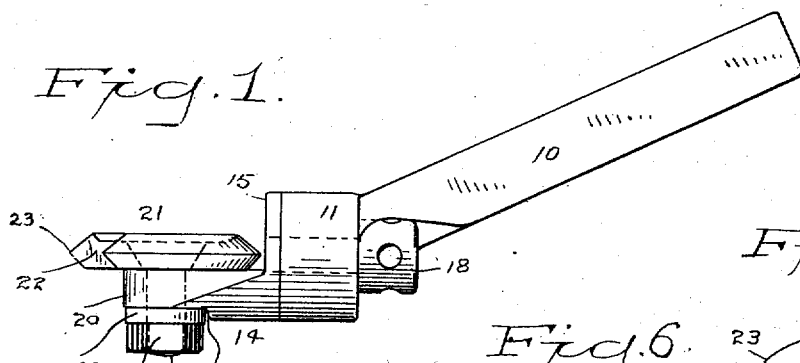
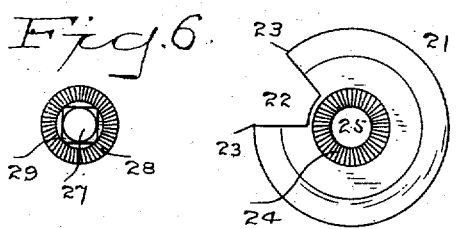
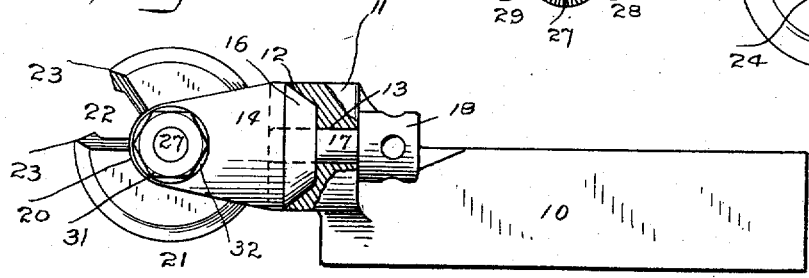
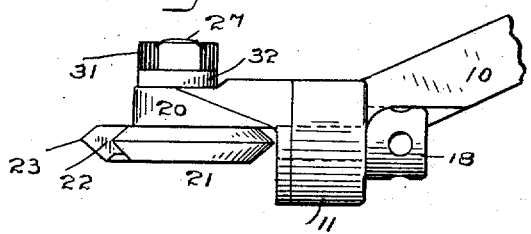
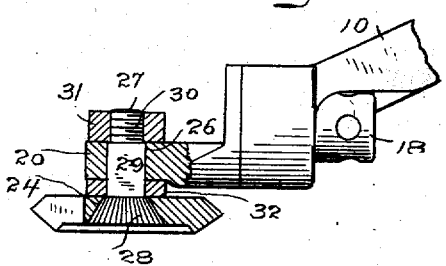
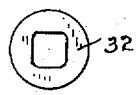
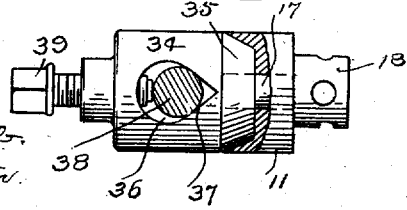
WITNESSES:
H. A. Lamb
S. W. Atherton
INVENTOR
Andrew K. Rosenbeck
BY
A. Wooster
ATTORNEY
THE NORRIS PETERS CO., WASHINGTON, D. C.

UNITED STATES PATENT OFFICE.

ANDREW K. ROSENBECK, OF NEW HAVEN, CONNECTICUT.

TOOL-HOLDER AND TOOL.

969,983.

Specification of Letters Patent. Patented Sept. 13, 1910.

Application filed July 21, 1909. Serial No. 508,730.

*To all whom it may concern:*

Be it known that I, ANDREW K. ROSENBECK, a citizen of the United States, residing at New Haven, county of New Haven, State of Connecticut, have invented an Improvement in Tool-Holders and Tools, of which the following is a specification.

This invention has for its object to produce a simple and inexpensive tool holder and combined right and left tool of any of the ordinary types as, for example, diamond point, half-diamond, fillet, side tools, thread cutting tools and cutting off tools adapted to be used upon lathes and planers generally, provision being made for setting the tool horizontally, vertically or at any required angle.

With these and other objects in view I have devised the novel tool holder and right and left disk tool of which the following description in connection with the accompanying drawing is a specification, reference characters being used to indicate the several parts.

Figure 1 is a plan view of my novel tool holder and tool as in use; Fig. 2 a corresponding elevation partly broken away to show the mode of attachment of the carrier to the holder; Fig. 3 a view corresponding with Fig. 1, showing the tool reversed; Fig. 4 a plan view partly in horizontal section to show the mode of attachment of the tool to the holder, the tool being offset from the holder by means of an interposed washer;
Fig. 5 an elevation of the tool detached; Fig. 6 an elevation of the locking stud detached; Fig. 7 an elevation of a washer detached; and Fig. 8 is a plan view illustrating the use of my novel tool holder with a carrier for boring and centering tools.

10 denotes the shank of my novel tool holder and 11 the head which may of course be either straight on the shank or offset at an angle, as in Fig. 1. The head is provided with a circular beveled socket 12 and with a hole 13 below the socket.

14 denotes the tool carrier which is provided with a base 15 having a beveled portion 16 which just fits in beveled socket 12 and is adapted to rotate therein to provide for adjusting the carrier at any required angle. The tool carrier and tool, presently to be described, are locked to the head by means of a screw 17 having a head 18 which bears upon the rear of head 11, the screw passing through hole 13 and engaging a threaded hole 19 in the base of the carrier. The tool carrier is provided with an arm 20 which lies at right angles to the plane of the base.

21 denotes the tool which is disk-shaped and has a cut-away portion 22, on opposite sides of which cutting edges 23 are formed, thus providing right and left cutters of any type in a single tool. The tool is provided in its outer face with a circular beveled serrated recess 24 and below the recess with a hole 25.

Arm 20 of the carrier is provided with a transverse angular opening 26. The tool is locked to the arm by means of a stud 27 having a beveled serrated head 28 corresponding with the beveled serrated recess in the outer face of the tool, an angular portion 29 corresponding with angular opening 26 and a threaded portion 30 which receives a nut 31.

It will be obvious that by loosening the nut and slightly withdrawing the stud the tool may be rotated to place either of the cutting edges at any required angle. When the tool is reversed, as in Fig. 4, a washer 32 is interposed between the tool and the arm of the carrier, the outer face of the arm being recessed as at 33 to receive either the washer or a nut (see Figs. 3 and 4). The serrations upon the head of the stud and in the recess in the face of the tool provide a perfect engagement so that the tool is locked rigidly against the possibility of movement.
It will be noted that this form of tool provides an amount of wearing surface greatly in excess of ordinary tools, that it is easily ground and will wear many times as long as the various types of tools in common use.
For use in thread cutting, the tool can readily be adjusted to cut a fine or coarse thread. This tool holder and tool, in brief, provides for all of the adjustments and all of the uses to which the tools mentioned above and similar tools are required to be placed.

In Fig. 8, I have illustrated the use of my novel tool holder in connection with boring and centering tools. Tool carrier 14 is removed and a carrier 34 is used in its stead. Carrier 34 is provided with a beveled portion 35 which engages beveled socket 12 in head 11 and is provided with a threaded hole to receive screw 17 as in the other form. Carrier 34 is provided with a transverse recess 36 having angular walls 37 against which the tool 38 is forced by a locking screw 39.

Having thus described my invention I claim:—

1. The combination with a tool carrier having a transverse angular opening, of a disk tool having in its face a beveled serrated recess and a stud having a beveled serrated head corresponding with the recess, an angular portion corresponding with the angular opening and a threaded portion adapted to receive a nut whereby the tool may be locked with either cutting edge at any required angle.

2. The combination with a tool carrier comprising a base adapted for attachment to a holder and an arm with a transverse angular opening, of a disk tool having in its face a serrated recess and a stud having a serrated head engaging the recess, an angular portion engaging the opening in the arm and a threaded portion adapted to receive a nut.

3. The combination with a tool holder having a head with a beveled socket and a tool carrier comprising a base having a beveled portion engaging the socket and an arm with a transverse angular opening, of a screw passing through the head and engaging the base of the carrier, a disk tool in said carrier, and means for preventing rotation of said tool.

4. The combination with a tool holder having a head with a beveled circular socket and below the socket a hole, of a tool carrier having a base with a beveled circular portion engaging the socket and a screw having a head bearing on the head of the holder and passing through the hole and engaging the base of the carrier, whereby the carrier may be adjusted at any angle.

5. The combination with a tool holder having a head with a socket, a tool carrier having a base provided with a reduced portion engaging the socket and a screw passing through the head and engaging the carrier whereby the latter may be set at any angle, of means for adjustably securing a tool to the carrier.

In testimony whereof I affix my signature in presence of two witnesses.

ANDREW K. ROSENBECK.

Witnesses:
　　Storey B. Howard,
　　A. W. Mitchell.